No. 765,216. PATENTED JULY 19, 1904.
W. C. WASHBURN.
TROLLEY GUARD.
APPLICATION FILED FEB. 24, 1904.
NO MODEL. 2 SHEETS—SHEET 1.
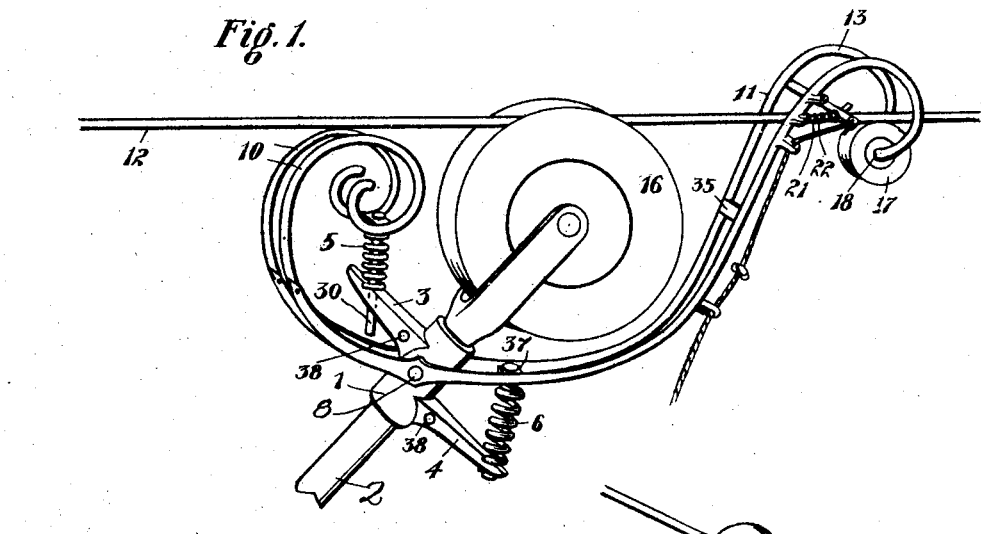
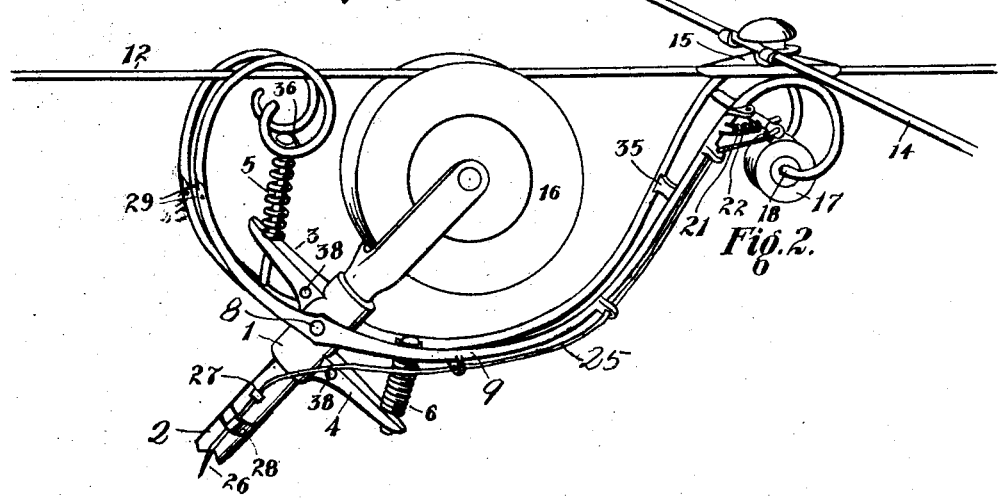
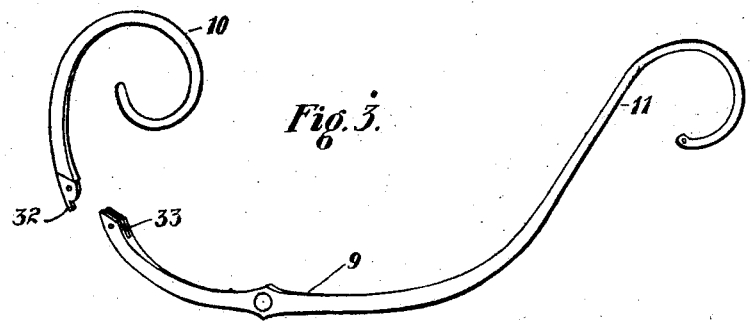
WITNESSES
INVENTOR
William C. Washburn
BY HIS ATTORNEY
James F. Ramsey

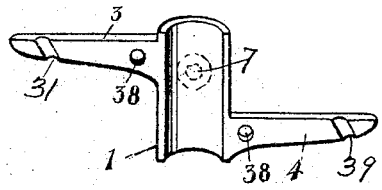
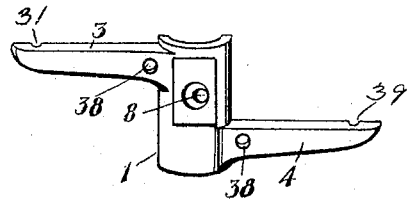
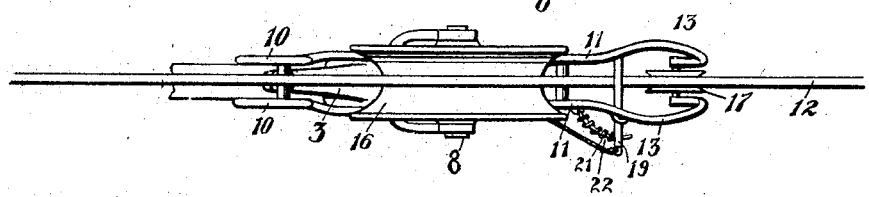
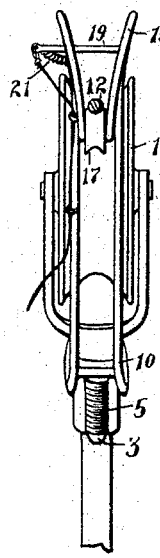
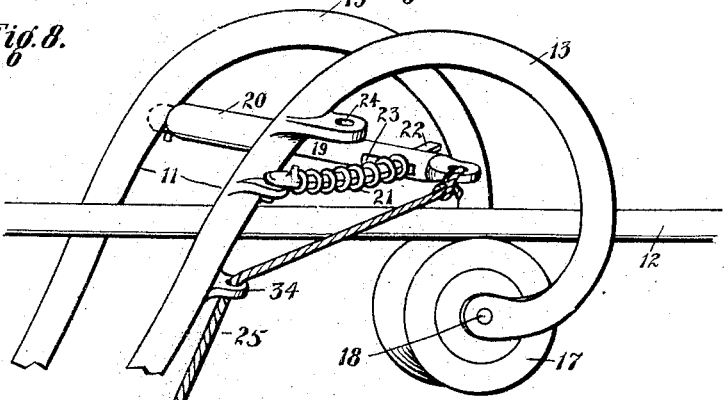
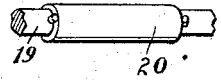

No. 765,216.　　　　　　　　　　　　　　　　　　　　　　　Patented July 19, 1904.

UNITED STATES PATENT OFFICE.

WILLIAM C. WASHBURN, OF CINCINNATI, OHIO.

TROLLEY-GUARD.

SPECIFICATION forming part of Letters Patent No. 765,216, dated July 19, 1904.

Application filed February 24, 1904. Serial No. 195,006. (No model.)

*To all whom it may concern:*

Be it known that I, WILLIAM C. WASHBURN, a citizen of the United States, residing at Cincinnati, in the county of Hamilton and State of Ohio, have invented certain new and useful Improvements in Trolley-Guards, of which the following is a specification.

My invention relates to improvements in guards for trolleys.

The object of my invention is to prevent the accidental disengagement of the trolley from the trolley-wire.

My invention consists in guards arranged in front and rear of the trolley, mounted on the trolley-pole near the trolley.

My invention also consists in the details of construction and in the parts and combination and arrangement of parts, as herein set forth.

In the drawings, which serve to illustrate my invention, Figure 1 is a perspective view showing a trolley held in contact with the trolley-wire by means of my invention. Fig. 2 is a similar view showing the rear guard depressed by contact with a transverse hanger-wire and the front guards in operative position to retain the trolley in contact with the trolley-wire. Fig. 3 is a side elevation of the front and rear guards disjointed. Fig. 4 is an inside view of part of the collar and front and rear platforms for supporting the guards. Fig. 5 is an outside view of the other part of the collar and front and rear platforms. Fig. 6 is a top or plan view of my trolley-guard in engagement with the trolley-wire. Fig. 7 is an enlarged detail perspective view showing my guard in position to hold the trolley from accidental disengagement with the trolley-wire. Fig. 8 is a rear view of the trolley and guard, showing the trolley in contact with a section of the trolley-wire and prevented from accidental departure therefrom by my guard. Fig. 9 is a perspective view of a part of the pivoted bar and rotating cylinder thereon.

The essential parts, their construction, arrangement, and function of my invention are substantially as follows:

A collar 1, that clasps the neck of the trolley-pole 2, with platforms 3 and 4 projecting forward and backward as bases for springs 5 and 6 and having at its sides pivots 7 and 8, on which are swung double levers 9, with front guard-arms 10 and rear guard-arms 11 extending therefrom. The rear guard-arms 11 extend above the current or trolley wire 12 in curves 13, that as inclined planes permit them to glide under the transverse suspension-wires 14 and hangers 15 whether the car (not shown) moves forward or backward. When such obstruction is passed, the spring 6 under the arms returns them to their normal position above the trolley-wire. These arms are designed to prevent lateral departure of trolley 16 from the trolley-wire 12.

Between the outer ends of the guard-arms 11 is a rotating spool 17, mounted on axle 18, connecting the ends of the rear guard-arms 11, which gives stability to the mechanism and lessens friction by rotating under the wire 12.

Attached to one of the rear guard-arms 11 at its forward part is an upper guard or transverse bar 19, inclosed in a revolving cylinder 20, whose purpose is to prevent accidental downward departure of the trolley 16 from the trolley-wire 12. At such time the upper guard 19 is brought down against the wire 12, the rotating cylinder 20 preventing friction. By the mechanism, including the spring 21, loosely mounted over pivoted arm 22, taking through slot 23 in upper guard 19, this upper guard 19 when it meets an obstruction, such as a cross-wire and hanger, swings backward on its pivot 24 parallel with the trolley-wire 12 to pass said obstruction and at once resumes its normal transverse position over the trolley-wire 12 by recoil of the spring 21.

When necessary to remove the trolley 16 to adjust it to another wire, the upper guard 19 may be swung around out of the way by the attachment 25 to the trolley-rope 26 at the same pull that lowers the trolley, the movement of the attachment being limited by the stop 27 engaging guide 28 on the trolley-pole as the trolley-rope is pulled. If desired, the arm 22 may be formed rigid; but I prefer to have it pivoted to permit of more ready shifting of the parts. The flaring outward of the upper curves 13 of the guard-arms 11 facilitates the work of the conductor when it is necessary to change his trolleys to other trolley-wires. When the moving car brings the rear guard-arms 11 to a cross obstruction, as the hangers, they are depressed by gliding under the hanger, and at the same time the front guard-arms are lifted above the trolley-wire 12, as shown in Fig. 2, thus becoming guards until the rear guard-arms are released and spring back to their normal position, the front guard-arms 10 simultaneously swinging to their normal position below the trolley-wire 12, as shown in Fig. 1. When the trolleys 16 must be lowered to approximate a horizontal position, as in passing under a bridge, the front guard-arms 10 give way backward before the obstruction by virtue of the joints 29 in them and the spring 5, which encircles the center bolt, which moves downward freely through the opening 31 of the platform 3, the spring returning the arms to position when the obstruction is passed. The joints 29 are preferably provided with a tongue 32 and groove 33 or suitable shoulders to prevent forward movement of the front guard-arms 10 beyond the positions shown in Figs. 1 and 2, while permitting them to yield downwardly if brought into contact with any obstruction from the front.

One of the rear guard-arms 11 is preferably provided with a guide 34 near arm 22 to give the proper throw to the upper guard 19 when it is being thrown by the attachment 25. A brace 35 is preferably secured between the arms 11 to strengthen the device. A strengthening-bar 36 is also secured between the front guard-arms 10 to form a support for the center bolt 30 and spring 5, and a similar strengthening-bar 37 is also secured between the rear guard-arms 11 to engage the spring 6.

I preferably construct the collar 1 of two parts, securely clamped and held together upon the trolley-bolt by means of bolts or rivets 38, extending transversely through the front and rear platforms 3 and 4. One of said platforms is provided with vertical opening 31 and the other with vertical opening 39 to permit free lengthwise movement of the center bolts therethrough.

It will be seen that my device is adapted to effectually guard the trolley from accidental departure from the trolley-wire at all times and at the same time to automatically pass all obstructions—such as transverse wires, hangers, &c.—and is at the same time easily disconnected from the wire when so desired by a simple downward pull on the trolley-rope.

Having thus described my invention, what I claim, and desire to secure by Letters Patent, is—

1. In a trolley-guard, a trolley-pole, a trolley, means for securing the trolley to the trolley-pole, pivoted arms adapted to constantly extend above the horizontal plane of the trolley-wire at each side thereof, and a spring adapted to hold the rear guard-arms normally in such position.

2. In a trolley-guard, a trolley-pole, a trolley, a collar on said pole, pivots upon said collar, guard lever-arms mounted upon said pivots, a platform on said collar, a spring interposed between said platform and guard lever-arms to hold said arms normally above each side of the trolley-wire to prevent accidental departure of the trolley therefrom.

3. In a trolley-guard, a trolley-pole, a trolley, means for securing the trolley to the pole, a collar upon said pole, pivots upon said collar, guard lever-arms mounted upon said pivots, a platform on said collar, a spring interposed between said collar and levers to hold the guard-arms normally above each side of the trolley-wire, an axle connecting the ends of said arms and a revolving spool thereon adapted to engage the trolley-wire.

4. In a trolley-guard, a trolley-pole, a trolley, means for securing it to said pole, a collar upon said pole, guard lever-arms pivoted to said collar, a platform mounted on the rear of said collar, a spring interposed between the rear arms and platform and adapted to hold said arms normally above each side of the trolley-wire, a platform mounted on the front of said collar and having a vertically-disposed opening therethrough, a brace between the ends of the front guard-arms, a center bolt projecting downwardly therefrom and through said opening, a spring surrounding said center bolt and adapted to hold said front guard-arms in normal position, and joints adapted to permit said front guard-arms to yield downwardly under pressure from the front.

5. In a trolley-guard, a trolley-pole, a trolley, means for securing the trolley to the pole, a collar upon said pole, pivoted guard-arms extending normally below the trolley-wire in front of the trolley and above the trolley-wire at each side in the rear of the trolley, a spring adapted to hold the rear guard-arms normally above each side of the wire, said arms being so pivoted and arranged that when the rear arms are forced below the trolley-wire the front guard-arms will be correspondingly and simultaneously elevated above said trolley-wire to guard the trolley from accidental departure from the trolley-wire at all times.

6. In a trolley-guard, a trolley-pole, a trolley, means for securing it to said pole, a collar upon said pole, a front platform, curved front arms jointed to swing backwardly under pressure and springs interposed between said arms and platform to return the arms to normal position after the pressure is removed or obstruction passed.

7. In a trolley-guard, a trolley-pole, a trolley, means for securing the trolley to the pole, rear guard-arms adapted to extend normally above the trolley-wire, means for pivotally securing said arms to the trolley-pole, an upper guard pivotally connected to one of said rear guard-arms, an arm pivoted near said upper guard and projecting through a slot in the same, a spring surrounding said arm and adapted to engage the upper guard and hold it normally in transverse position with relation to said arms.

8. In a trolley-guard, a trolley-pole, a trolley, means for securing it to said pole, rear guard-arms adapted to extend normally in a plane above the trolley-wire, means for pivotally securing said arms to the trolley-pole, an upper transverse guard pivotally connected to one of said rear guard-arms, an arm pivoted near said upper transverse guard and projecting through a slot in the same, a spring upon said arm adapted to hold said transverse upper guard normally in contact with the opposite rear arm, and means connecting said transverse upper guard and the trolley-rope to throw same when desired.

9. In a trolley-guard, a trolley-pole, a trolley, means for securing it to said pole, rear guard-arms adapted to extend normally in a plane above the trolley-wire, means for pivotally securing said arms to the trolley-pole, an upper transverse guard pivotally connected to one of said rear guard-arms, an arm pivoted near said upper transverse guard and projecting through a slot in the same, a spring adjacent said arm adapted to hold said transverse upper guard normally in contact with the opposite rear arm, a revolving cylinder on said upper transverse guard and means for connecting said transverse guard and the trolley-rope to throw the guard when desired.

10. In a trolley-guard, a collar formed of two parts suitably secured together and having front and rear platforms, substantially as and for the purposes specified.

WILLIAM C. WASHBURN.

Witnesses:
JAMES N. RAMSEY,
C. W. EARNIST.